US006344898B1

(12) United States Patent
Gemma et al.

(10) Patent No.: US 6,344,898 B1
(45) Date of Patent: Feb. 5, 2002

(54) INTERFEROMETRIC APPARATUS AND METHODS FOR MEASURING SURFACE TOPOGRAPHY OF A TEST SURFACE

(75) Inventors: Takashi Gemma, Tokyo; Hiroshi Ichihara; Hajime Ichikawa, both of Yokohama; Shigeru Nakayama, Kawasaki; Bruce Jacobsen, Tokyo, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/396,491

(22) Filed: Sep. 14, 1999

(30) Foreign Application Priority Data

Sep. 14, 1998 (JP) ............................................. 10-260698
Sep. 21, 1998 (JP) ............................................. 10-266117

(51) Int. Cl.$^7$ ................................................ G01B 9/02
(52) U.S. Cl. ...................................... 356/513; 356/521
(58) Field of Search .............................. 356/512, 513, 356/514, 515, 521

(56) References Cited

U.S. PATENT DOCUMENTS

| 4,594,003 A | * | 6/1986 | Sommargren | ............... 356/514 |
| 5,004,346 A | * | 4/1991 | Kuhel | ......................... 356/513 |
| 5,076,695 A | | 12/1991 | Ichihara | |
| 5,548,403 A | * | 8/1996 | Somargren | .................. 356/513 |
| 5,835,217 A | | 11/1998 | Medecki | |
| 5,933,236 A | * | 8/1999 | Sommargren | ............... 356/513 |

OTHER PUBLICATIONS

Phase Shift Diffraction Interferometry for Measuring Extreme Ultraviolet Optics, Sommargren, OSA Tops, 1996, 108–112.*
Medecki et al., "Phase–Shifting Point Diffraction Interferometer," Optics 21:1526–1528 (1996).

* cited by examiner

Primary Examiner—Samuel A. Turner
(74) Attorney, Agent, or Firm—Klarquist Sparkman LLP

(57) ABSTRACT

Apparatus and methods are disclosed for measuring the surface topography of a test surface, such as a spherical or aspherical surface of a refractive or reflective optical element. The test surface is measured by detecting the state of interference fringes generated by interference of a reference light beam and a measurement light beam that interacts (e.g., reflects from) the test surface. The reference and measurement beams are produced by a point light source having a reflective surface. The point light source is disposed between a source of input light and the test surface. The measurement beam (after interacting with the test surface) and the reference beam are caused to interfere with each other to produce a first interference-fringe state. The distance between the point light source and the test surface can be changed between production of the first interference-fringe state and production of a second interference-fringe state. The profile of the test surface is determined by analyzing the resulting interference fringes. A null element can be used to convert a spherical wavefront of the measurement beam into an aspherical wavefront corresponding to the aspherical test surface, or to convert an aspherical wavefront generated by reflection of a spherical wavefront from an aspherical test surface into a spherical or planar wavefront.

4 Claims, 8 Drawing Sheets

INTERFEROMETRIC APPARATUS AND METHODS FOR MEASURING SURFACE TOPOGRAPHY OF A TEST SURFACE

FIELD OF THE INVENTION

The present invention pertains to apparatus and methods used for measuring surface shapes (surface topography) with high accuracy and precision. More specifically, the invention concerns such apparatus and methods that employ interferometry for measuring topographical characteristics of a surface of a sample such as an optical element.

BACKGROUND OF THE INVENTION

A conventional use of a Fizeau interferometer or a Twyman-Green interferometer is the measurement of the shape (i.e., surface topography) of a spherical surface, such as the surface of a spherical lens. To perform such measurements using either of these types of interferometers a reference surface is conventionally required. I.e., conventional measurements of the surface topography of a spherical surface of a sample are determined by comparison with an actual corresponding "ideal" reference surface. As a result, the accuracy of the measurements cannot exceed the accuracy of the reference surface.

A conventional way in which to solve such a problem is disclosed in Japanese Laid-Open (Kokai) Patent Application No. 2-228505 disclosing an interferometer not requiring a reference surface. Specifically, this reference discloses a so-called point-diffraction interferometer, abbreviated "PDI." A PDI employs an ideal spherical-surface wave, generated by diffraction of light passing through a pinhole, for use as a reference wavefront. Such a device allows high-accuracy and high-precision measurements of the topography of aspherical surface.

Unfortunately, the conventional PDI technique summarized above is not usable for measuring the surface topography of an aspherical surface. This is because, when measuring a spherical surface, very few interference fringes (i.e., a "sparse" pattern of fringes) are generated by regions of the surface where the curvature radius of the spherical wave produced by the pinhole coincides with the curvature radius of the sample. But, when measuring an aspherical surface, the curvature radius varies according to the location on the surface; as a result, the spacing of interference fringes is sparse only in regions that are too dense for measuring.

SUMMARY OF THE INVENTION

In view of the shortcomings of the conventional art as summarized above, an object of the invention is to provide apparatus and methods for performing high-accuracy measurements of the surface topography of aspherical surfaces as well as spherical surfaces.

To such end, and according to a first aspect of the invention, various representative embodiments of apparatus for measuring the surface topography of a test surface of a sample are provided. A first representative embodiment of such an apparatus comprises a point light source configured and situated relative to a detector and the sample so as to produce, from an input light, a beam of light divergently propagating as a prescribed wavefront from a point on the point light source. The beam comprises a measurement-beam portion, directed toward the test surface so as to reflect from the test surface, and a reference-beam portion. The light detector is configured to produce an output signal encoding data corresponding to an interference characteristic of light received by the detector. The point light source also comprises a reflective surface oriented so as to receive the measurement-beam portion reflected from the test surface and to cause the measurement-beam portion returning to the point light source to reflect from the reflective surface toward the detector. The measurement-beam portion reflected from the test surface and the reference-beam portion interfere with each other so as to produce an interference fringe received by the detector. The interference fringe has a characteristic corresponding to a surface topography of the test surface relative to the prescribed wavefront. An actuator is configured and situated so as to move at least one of the sample and the point light source relative to each other so as to change the distance between the test surface and the point light source as required. A processor is situated so as to receive the output signal from the detector. The processor is configured to provide a measurement of the surface topography from the interference fringe received by the detector.

The point light source desirably comprises a reflective mirror defining a pinhole, wherein the prescribed wavefront is produced by diffraction of the input light as the input light passes through the pinhole. The reflective mirror can be oriented so as to define a plane that is perpendicular to a propagation axis of the input light incident on the point light source. Alternatively, the reflective mirror can be oriented so as to define a plane that is at an angle of less than 90° to a propagation axis of the input light incident on the point light source.

In an alternative configuration, the point light source can comprise an optical fiber configured to conduct the input light. Such an optical fiber desirably comprises an end face serving as the reflective surface of the point light source. The end face also serves as the point from which the prescribed wavefront divergently propagates due to diffraction of the input light.

The prescribed wavefront can be a spherical wavefront. Alternatively, the prescribed wavefront can be any of various suitable aspherical wavefronts.

The point light source can be configured and oriented such that the measurement beam interferes with the reference beam as the measurement beam, reflected from the test surface, propagates to the reflective surface of the point light source. Alternatively, the point light source can be configured and oriented such that the measurement beam interferes with the reference beam as the measurement beam, reflected from the reflective surface of the point light source, propagates to the detector.

The apparatus can further comprise a light source configured to produce the input light. The input light can comprise a single or multiple wavelengths of light as required. If the input light comprises multiple wavelengths, a wavelength selector can be included to permit selection, from the multiple wavelengths of input light, a particular wavelength for input to the point light source. In such a configuration, the point light source can be configured to produce, from the particular wavelength, the measurement beam portion and the reference beam portion.

The apparatus can further comprise a light-path adjuster situated between the input light source and the point light source. The light-path adjuster is desirably configured to cause a path length of the reference-beam portion to coincide with a path length of the measurement-beam portion so as to permit adjustment of a contrast parameter of the interference fringe.

According to another aspect of the invention, methods are provided for measuring a profile of a test surface of a sample. According to a representative embodiment of such a method, a point light source is provided having a reflective surface. The point light source is situated so as to receive an input light and to produce from the input light a measurement-beam portion and a reference-beam portion divergently propagating as a prescribed wavefront from a point. The test surface is irradiated with the measurement-beam portion so as to cause the measurement-beam portion to reflect from the test surface and then reflect from the reflective surface. At a first distance of the test surface from the point light source, the measurement-beam portion reflected from the test surface interferes with the reference-beam portion so as to produce a first pattern of interference fringes. A pattern characteristic of the first pattern of interference fringes is detected. The first distance of the test surface from the point light source is changed to a second distance. At the second distance, the measurement-beam portion reflected from the test surface interferes with the reference-beam portion so as to produce a second pattern of interference fringes. A pattern characteristic of the second pattern of interference fringes is detected, and the pattern characteristic of the second pattern of interference fringes is compared with the pattern characteristic of the first pattern of interference fringes so as to obtain a measurement of a topographical profile of the test surface.

In the above-summarized method, the reflective surface of the point light source can define a pinhole. In such a configuration, the prescribed wavefront of the measurement-beam and reference-beam portions is generated by diffraction of input light as the input light passes through the pinhole. Alternatively, the point light source can be configured as an optical fiber that conducts input light, wherein the optical fiber terminates with an end face defining the reflective surface of the point light source. In this alternative configuration, the prescribed wavefront of the measurement-beam and reference-beam portions is generated by diffraction of input light as the input light is conducted through the optical fiber and exits the end face.

The input light can comprise multiple wavelengths. In such an instance, a first specific wavelength, of the multiple wavelengths, of input light is selected to be received by the point light source. The point light source generates the measurement-beam and reference-beam portions from the first specific wavelength. Measurements can be performed with the measurement-beam portion and reference-beam portion at the first specific wavelength. Then, a second specific wavelength, of the multiple wavelengths, of input light is selected to be received by the point light source. The point light source generates the measurement-beam and reference-beam portions from the second specific wavelength with which measurements are again obtained. The pattern characteristics of all sets of interference fringes are compared so as to obtain a measurement of a topographical profile of the test surface.

Desirably the interfering measurement-beam and reference-beam portions are collimated as said portions are directed to the light-receiving surface of the image detector. Such collimation can be performed by passage of the portions through a lens.

If the input light comprises a temporally incoherent light, the method can further include providing an input-light source for producing the input light supplied to the point light source. After removing the sample from a measurement position, a light-path distance from the input-light source to the point light source is adjusted until interference fringes are detected having maximal contrast. The sample is then returned to the measurement position and the light-path distance from the input-light source and the point light source is adjusted until interference fringes are detected having maximal contrast. A difference in the light-path distance from the input-light source and the point light source is determined when the sample is in the measurement position versus when the sample is not in the measurement position. The difference provides a measure of the distance from the point light source to the test surface.

The present invention also permits measurements of the topographical profile of an entire aspherical surface at one time. A representative apparatus for such a purpose comprises a light detector configured to produce an output signal encoding data corresponding to an interference characteristic of light received by the detector. A point light source is configured and situated relative to the detector and the sample so as to produce, from an input light, a beam of light divergently propagating as a prescribed spherical wavefront from a point on the point light source. The beam comprises a measurement-beam portion directed toward the test surface so as to reflect from the test surface, and a reference-beam portion. The point light source comprises a reflective surface oriented so as to receive the measurement-beam portion reflected from the test surface and to cause the measurement-beam portion returning to the point light source to reflect from the reflective surface toward the detector. The measurement-beam portion reflected from the test surface and the reference-beam portion interfere with each other so as to produce an interference fringe received by the detector. The interference fringe has a characteristic corresponding to a surface topography of the test surface relative to the prescribed wavefront. A processor is situated so as to receive the output signal from the detector, and is configured to determine a measurement of the surface topography from the interference fringe received by the detector. An optical element is situated between the point light source and the test surface. The optical element is configured to convert the spherical wavefront of the measurement light, propagating from the point to the test surface, into a desired aspherical wavefront.

Another embodiment of an apparatus for measuring a profile of an aspherical test surface of a sample comprises a point light source. The point light source is configured and situated relative to the sample so as to produce, from an input light, a measurement beam of light propagating as a prescribed spherical wavefront from a point on the point light source to the test surface. A beamsplitter is situated so as to receive light of the measurement beam reflected from the test surface. The beamsplitter is configured to split the reflected measurement beam into first and second measurement-beam portions each propagating along a respective path. A light-diffraction element is situated in the path of the first measurement-beam portion. The light-diffraction element is configured to diffract the light of the first measurement-beam portion into multiple orders of diffracted light. The light-diffraction element is situated so as to cause the diffracted light to interfere with light of the second measurement-beam portion and produce interference fringes. A detector is configured and situated so as to detect the interference fringes. An optical element can be situated between the test surface and the beamsplitter and configured so as to convert the aspherical wavefront of the measurement beam reflected from the test surface into a desired spherical wavefront. Alternatively, the optical element can be situated between the point light source and the test surface and configured so as to convert the spherical wavefront of the measurement beam from the point light source into a desired aspherical wavefront.

Yet another embodiment of an apparatus for measuring a profile of an aspherical test surface of a sample includes a point light source as summarized above that produces a reference beam and a measurement beam. Light of the measurement beam reflected from the test surface interferes with the reference beam to produce interference fringes. A detector receives the interference fringes and a processor connected to the detector analyzes the interference fringes so as to calculate, from such analyses, a state of the interference fringes. A reflective surface is situated in a light path between a source of the input light and the test surface, wherein the reflective surface is configured to define the point light source. An optical element is situated in a light path different from the light path extending from the test surface to the reflective surface. The optical element converts the wavefront propagating from the test surface from having an aspherical wavefront to having a spherical wavefront. The measurement beam emitted from the point light source reflects from the test surface, then from the reflective surface, and passes through the optical element.

Alternatively, the optical element can be situated in a light path extending from the test surface to the reflective surface. Such an optical element converts the wavefront propagating from the test surface from having a spherical wavefront to having an aspherical wavefront. A light-diffraction element is situated in a light path different from the light path extending from the test surface to the reflective surface. The light-diffraction element defines a point light source and generates, from light entering the point light source, a diffracted light propagating from the point light source. In such a configuration, the measurement beam emitted from the point light source passes a first time through the optical element, reflects from the test surface, passes a second time through the optical element, and reflects from the reflective surface to the detector.

The foregoing and other features and advantages of the invention will be more apparent from the following detailed description, which proceeds with reference to the accompanying drawings.

DETAILED DESCRIPTION

According to the present invention, a spherical wave produced by diffraction of light through a pinhole, constituting a point light source, is used as a best-fit reference for measuring a subject aspherical surface. As a result, in contrast to a Fizeau interferometer or Twyman-Green interferometer, an actual reference surface is not required for evaluating the surface topography of a sample aspherical surface. This allows the surface topography of aspherical surfaces, as well as spherical surfaces, to be measured with high accuracy and precision. The measurements are not adversely affected by deviations from perfection of a reference surface.

First Representative Embodiment

Figure 1:
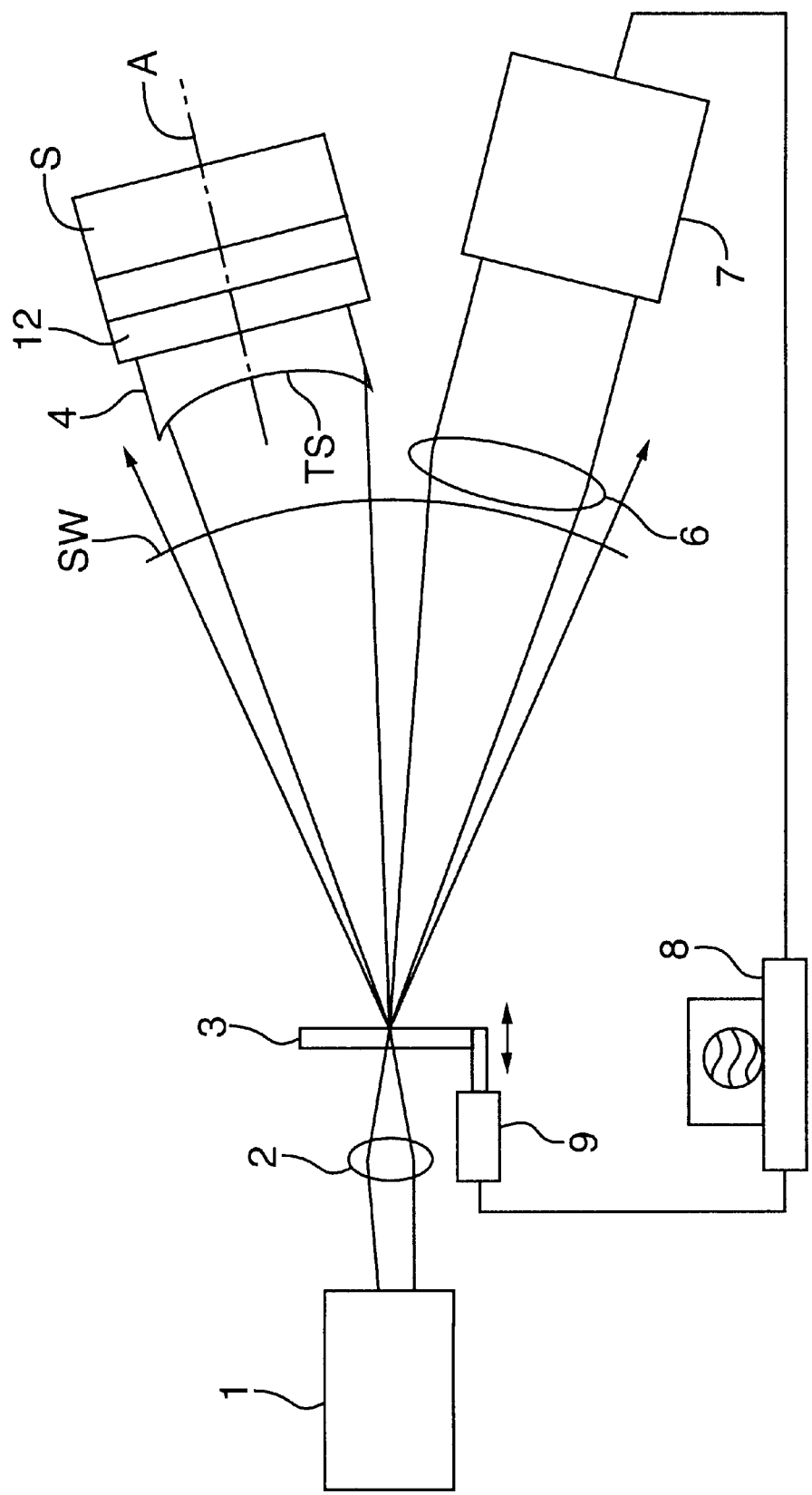
FIG. 1 is a schematic optical diagram of an apparatus according to a first representative embodiment of the present invention.

A first representative embodiment is depicted in FIG. 1. The FIG. 1 embodiment comprises a laser (or analogous) light source 1 and a reflective mirror 3 that defines a pinhole aperture 3c (not shown in FIG. 1, but see FIG. 3). The mirror 3 is disposed between the light source 1 and a surface ("test surface" TS, e.g., an aspherical surface) of a sample 4 (e.g., refractive or reflective optical element) to be measured.

In general, the wavefront produced by diffraction of light through a pinhole aperture may be regarded as an ideal spherical wavefront (for the test surface TS) under conditions in which the diameter $\phi$ of the pinhole aperture 3c satisfies the condition:

$$\lambda/2 < \phi < \lambda r/2a$$

wherein $\lambda$ is the wavelength, r is the approximate curvature radius of the test surface TS being measured, and a is the effective diameter ("clear aperture") of the test surface. Under such a condition, high-accuracy and high-precision measurements of a sample surface can be obtained without having to use an actual reference surface. (The term r/2a corresponds to the angle, at the pinhole, subtended by the reference sample.)

As an alternative to a pinhole aperture 3c defined by a mirror 3, an optical fiber or optical waveguide can be used, as discussed in certain other representative embodiments disclosed herein. In such an alternative configuration, the variable $\phi$ is the diameter of the transmitting portion of the optical fiber or optical waveguide. Whenever an optical fiber or optical waveguide is employed, the end surface of the optical fiber or waveguide constitutes the reflective surface.

Figure 4:
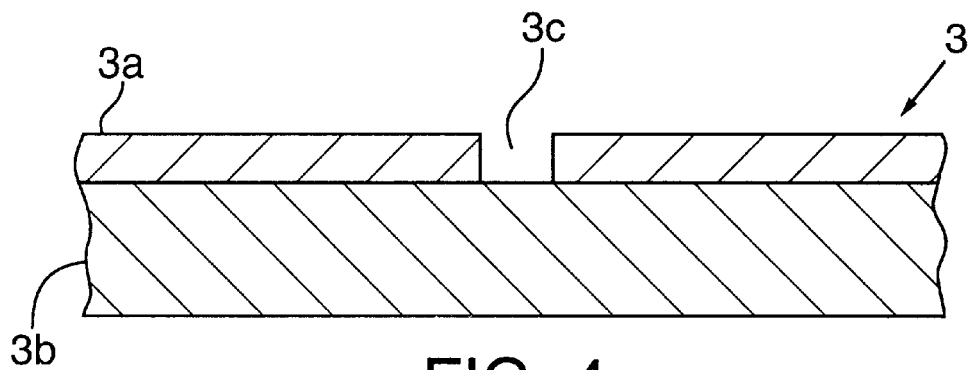
FIG. 4 is a vertical section of the pinhole mirror used in the first representative embodiment.

The pinhole aperture 3c in the mirror 3 desirably constitutes a point light source. Hence, the mirror 3 and the pinhole aperture 3c are collectively termed a "pinhole mirror." A pinhole mirror, as shown in FIG. 4, desirably comprises a substrate 3b (e.g., glass) having a surface on which a metal film 3a is applied (e.g., by vacuum-evaporation or sputtering). The metal film 3a defines, desirably in the center of the mirror, a pinhole aperture 3c that can be formed in the metal film 3b by etching or the like. As an alternative to defining the pinhole aperture 3c only in the metal film 3a, the pinhole aperture 3c can extend also through the thickness of the mirror 3.

The metal film 3a has characteristics such that, for example, if an incident light beam (e.g., from the test surface TS) is an ideal spherical wavefront, the corresponding reflected light beam is also an ideal spherical wavefront. If the reflected light beam did not exactly correspond to the respective incident light beam from the test surface TS, then it would be impossible to ascertain the characteristics of the actual wavefront propagating from the test surface TS.

A lens 2 focuses light, emitted from the light source 1, onto the pinhole aperture 3c. Light diffracted by the pinhole aperture 3c propagates divergently downstream of the pinhole aperture 3c as an ideal spherical wavefront SW (arrows). A portion of the spherical wavefront SW is directed onto the surface (termed the "test surface" TS) of the sample 4 as a "measurement beam." The measurement beam reflected by the test surface TS is focused on the mirror 3. Such focusing is performed by the test surface. Hence, the test surface should be positioned such that the mirror 3 is at or essentially at the focal point of the test surface. The measurement beam reflected by the mirror 3 is collimated by passage through a lens 6. The measurement beam then reaches a light-receiving surface of a detector 7 desirably comprising a charge-coupled device (CCD).

In addition to collimating the measurement beam, the lens 6 focuses an image of the test surface TS on the light-receiving surface of the detector 7. To accurately determine the surface topography of the test surface TS, the lens 6 desirably is configured to have maximal correction of distortion and other aberrations. Coordinates of interference fringes as received on the light-receiving surface of the detector 7 desirably are accurately correlated with the coordinates of corresponding locations on the test surface TS by determining any offset of coordinates imparted by the lens 6. i.e., the actual distortion effect of the lens 6 on each coordinate is compared with the respective expected coordinate that would otherwise be obtained if the lens 6 were operating according to ideal design specifications. Any necessary correction can be performed by a computer 8 connected to the detector 7.

Figure 16:
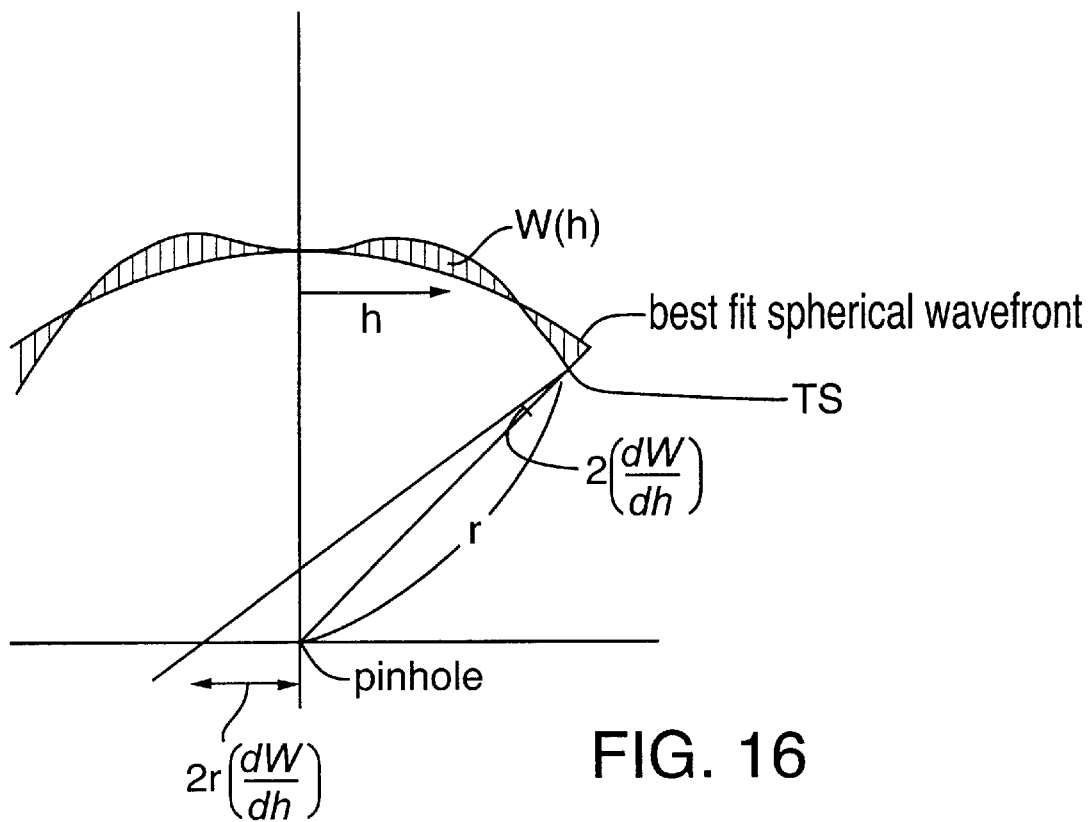
FIG. 16 illustrates certain relationships as discussed in the First Representative Embodiment.

A portion of the ideal spherical wavefront produced by the pinhole aperture 3a is collimated (for use as a reference beam) by the lens 6, after which the reference beam reaches the detector 7. If the test surface is aspherical, then light of the measurement beam reflected by the test surface TS is normally not focused to a point on the mirror 3, but rather is distributed to some extent over a portion of the surface of the mirror 3. Referring to FIG. 16, W(h) denotes a difference between the aspherical test surface TS and a best-fit spherical wavefront directed onto the test surface TS. The radius of spread of reflected light on the surface of the mirror 3 is $(2r)dW(h)/dh$. If $dW_{max}$ is the maximum value of $dW(h)/dh$ within a range in which the surface topography can be determined by analyzing interference fringes, then the surface 3a must be sufficiently accurate (an ideal planar surface) to obtain accurate measurements of the surface topography of the test surface within the range of $(2r)(dW_{max})$.

Interference fringes are generated on the light-receiving surface of the detector 7 by interference between the reference beam and the measurement beam reflected from the test surface TS. The output from the detector 7 is input into the computer 8 that analyzes data encoded in the output. The topographical profile of the test surface TS is calculated from the pattern of interference fringes as detected by the detector 7.

If the test surface TS is aspherical, then the interference fringes tend to be distributed sparsely in locations where the local curvature radius of the test surface TS coincides with the curvature radius of the irradiating best-fit spherical wave. With increased departure from coincidence of these curvature radii, the distribution of interference fringes is denser.

The resolution with which interference fringes can be observed is limited by the pixel spacing in the detector 7. If the period of the interference fringes is shorter than the combined width of two adjacent pixels of the detector 7, then accurate measurements of surface topography cannot be performed. Accordingly, to ensure accurate and precise measurements, it is desirable that the period of the interference fringes be at least four times the width of a pixel of the detector 7.

As a result of the limited resolution of the detector 7, if the test surface TS deviates substantially from its ideal spherical counterpart, then it can be difficult or impossible to measure the surface topography of the entire test surface at one time. In such an instance, measurements can be performed multiple (at least two) times, with each measurement being obtained after varying the axial spacing between the test surface TS and the mirror 3. By changing the spacing between an aspherical test surface and the mirror, a corresponding change is made in the position, along the optical axis A of the test surface, at which the curvature radius of the ideal spherical wavefront coincides with a portion of the curvature radius of the test surface. (With a spherical test surface, exact correspondence of the curvature radius of the test surface and the curvature radius of the spherical wavefront occurs at only one axial position of the test surface TS relative to the mirror 3.)

The mirror 3 can be moved relative to the test surface TS by actuating a motor 9 (e.g., stepping motor, ultrasonic motor, or other suitable motor) operably connected to the mirror by any suitable means serving to cause the mirror 3 to move (double-headed arrow) whenever the motor 9 is actuated. The motor 9 is connected to the computer 8 to ensure feedback to the computer 8 of data concerning the amount of movement imparted to the mirror 3 relative to the test surface TS. If the amount of movement imparted to the mirror 3 is significant, then the lens 2 desirably is moved together with the mirror 3 to ensure proper convergence of light from the source 1 on the pinhole 3c.

The region on the test surface TS that is measured at each position of the mirror 3 is different (i.e., different in terms of the location(s) on the test surface at which correspondence of curvature radii occurs) from the region measured at the previous and at any subsequent positions of the mirror. This is because accurate measurements are possible only in the vicinity of where the curvature radius of the spherical measurement-beam wavefront coincides with a localized best-fit spherical radius of the aspherical surface. Hence, data from at least two positions of the mirror are usually obtained. The computer 8 receives the data from each region as well as data concerning the corresponding position of the mirror 3, combines the data, and performs calculations of the surface topography of the test surface TS from such data. i.e., at a first position of the mirror 3, measurements are performed in locations in which a measurable distribution of interference fringes is present. The placement of the mirror 3 is then changed so as to shift the locations at which a measurable distribution of interference fringes is present. Desirably, such areas at the first and subsequent position of the mirror 3 overlap. This process is repeated as required to cover the entire area of the test surface. The results of the measurements at all the positions of the mirror 3 are combined. By obtaining measurements at each of multiple positions of the mirror 3, it is possible to measure a broader area of an aspherical test surface than would be possible with a measurement performed at a single position of the mirror.

As noted above, the spacing between the mirror 3 and the test surface TS can be changed by moving the test surface and/or by moving the mirror. (In this embodiment, the mirror 3 preferably is moved). If the test surface TS is moved, it is desirable for best accuracy and precision that the amount of movement as well as any change in the angular orientation of the test surface (relative to the optical axis of the test surface) be monitored very accurately. To such end, the sample 4 is desirably mounted on a highly accurate stage S of which the position is accurately measured using a length-measuring interferometer (not shown). Any change in the inclination of the test surface TS relative to the optical axis A occurring during movement of the stage S can be measured in a similar manner. If any change in inclination of the test surface S is detected, the inclination can be "corrected" by the computer 8 using alignment-error correction software.

As an alternative to the aforementioned method, it is also possible to combine the measurement results with high accuracy using the following method, especially if the test surface is rotationally symmetrical. The phase distribution obtained by analyzing the interference fringes is integrated between 0 (zero) and $2\pi$, or 0 and $\lambda/2$ in terms of surface shape. This is because light and dark interference fringes represent a periodic function having a period of $2\pi$ ($\lambda/2$) and cannot distinguish differences in integer multiples of $2\pi$ ($\lambda/2$). The phase difference between a point in the center where the interference fringe phase is zero and a point in the peripheral measurement area where the interference fringe phase is zero is an integer multiple of $\lambda/2$. Hence, the phase in the peripheral measurement area can be set using the center area as a reference. The value of the integer cannot be obtained from various measurements, but can be estimated from the design value of the test surface. The integer also can be determined so as to create no inconsistency in the measurements of ring bands. In the aforementioned method, a drift occurring between measurements of different ring bands may introduce measurement errors; however, the alternative method described above is not prone to drift errors because it uses the center area of the test surface as a reference.

In the interferometer of the present embodiment, in order to calculate (from detected interference fringes) the profile of a portion of the aspherical test surface TS with high accuracy, the aspherical test surface TS can be moved slightly along its optical axis A (i.e., according to the well-known phase-shift interferometry method) using a piezoelectric element 12 mounted to the stage S.

Since each profile of an aspherical test surface measured at a particular instant in time represents only a portion of the test surface TS, the measurement time required to measure the profile of the entire test surface TS could be excessive. To solve this problem, a so-called "null element" can be inserted between the pinhole 3c and the test surface TS to form a wavefront, incident on the test surface, that more closely coincides with the profile of the test surface. Such a method allows the entire test surface to be measured in a single step or at least in fewer steps. Of course, the measurement accuracy of such a method would depend on the precision with which the null element is manufactured.

In an alternative method, a reference standard (a reference sample having an extremely accurately shaped surface) of which the profile has been precisely measured beforehand can be used in conjunction with a null element to measure the test surface. (See FIG. 15 herein and accompanying text.) First, the reference standard is calibrated using a method according to, e.g., this representative embodiment. Second, interferometric measurements of the reference standard are performed using a null element inserted as described above. The measurement results will include any error of the null element. To determine the error, the results of the first step are subtracted from the results of the second step. Then, the reference standard is replaced with the sample having the test surface, and the profile of the test surface is measured using the null element and a configuration as described below in FIG. 6 and accompanying text.

Figure 15:
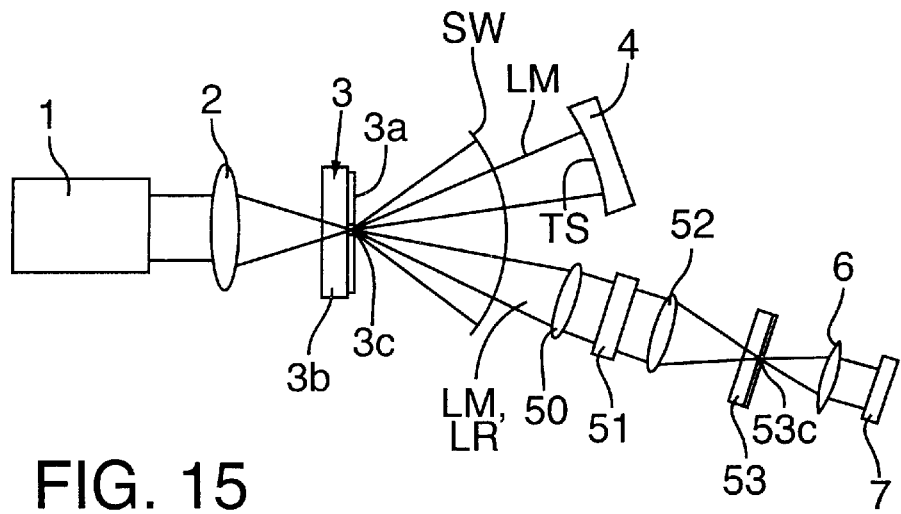
FIG. 15 is a schematic optical diagram of an apparatus according to a seventh representative embodiment of the invention.

In practice, the FIG. 15 configuration is first used to calibrate the reference standard. Second, the FIG. 6 configuration is used to measure the profile of the test surface (inserted in place of the reference standard). Third, the result obtained in the first step is subtracted from the result obtained in the second step; any remainder represents a difference in profile between the test surface and the reference standard. Any measurement result obtained of the test surface is corrected according to any measured error of the reference standard to yield a measurement of the error of the profile of the test surface.

In FIG. 1, the aspherical test surface TS that is being measured is situated on an axis A that is oriented at an inclination relative to the optical axis of the lens 2. In cases in which the aspherical test surface TS has an out-of-axis profile, the sample 4 could be situated such that the axis of the aspherical test surface coincides with the optical axis of the lens 2. (If the test surface TS has an axis of symmetry but the axis is not in the center of the test surface, then that test surface has an "out-of-axis" profile.) Also, if the aspherical test surface TS is annular, then it may be situated such that the axis A of the test surface is coincident with the optical axis of the lens 2. It is also possible to situate the lens 6 and detector 7 on the optical axis of the lens 2.

These alternative configurations offer benefits such as compactness of the optical systems and ease of adjustment (since the optical axes are lined up along a straight line).

Second Representative Embodiment

Figure 2:
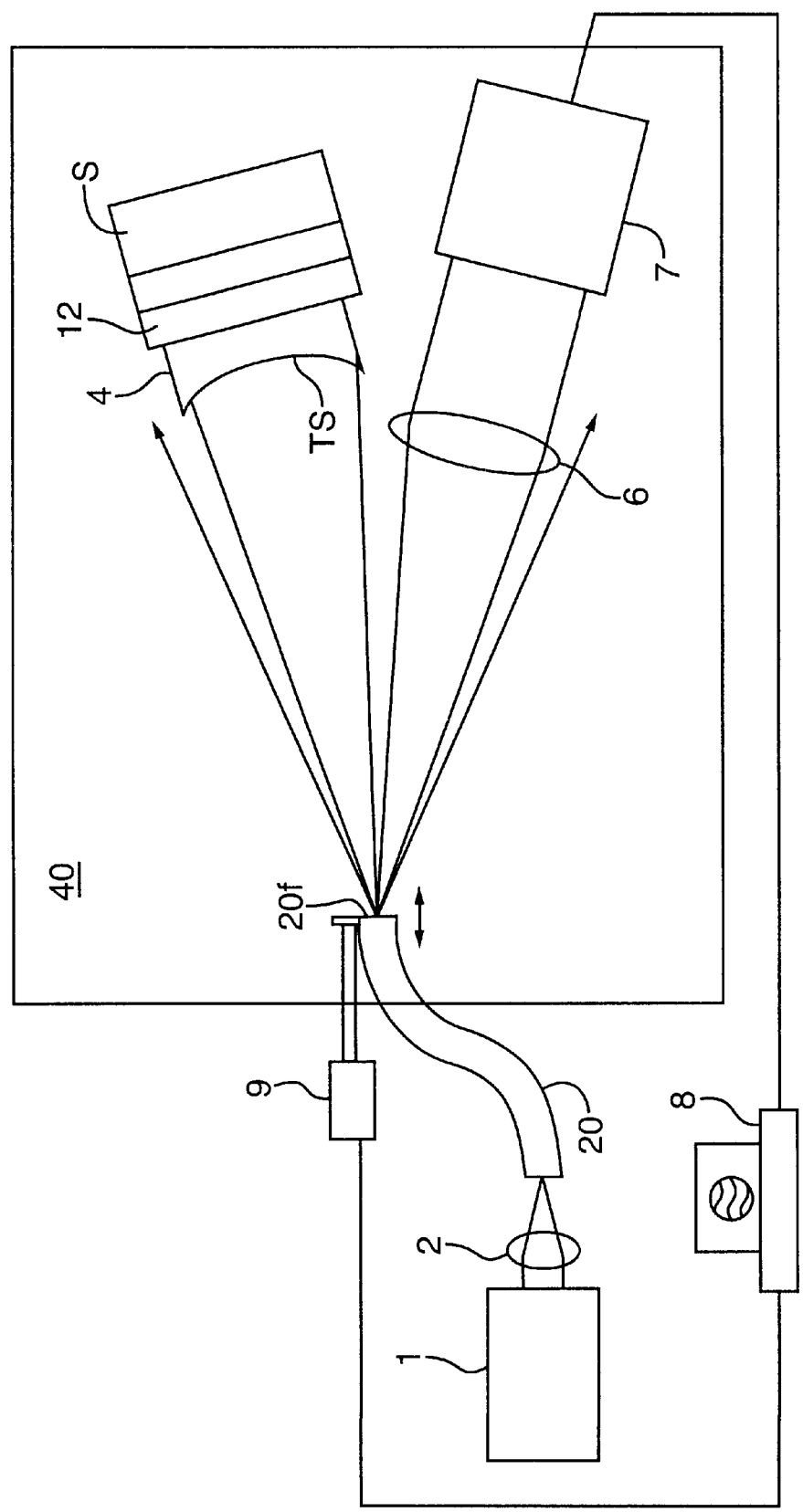
FIG. 2 is a schematic optical diagram of an apparatus according to a second representative embodiment of the invention.

A measurement apparatus according to this embodiment is shown in FIG. 2, in which components that are the same as in the FIG. 1 embodiment have the same respective reference numerals and are not described further. In the FIG. 2 embodiment, an optical fiber 20 is used instead of the pinhole mirror 3 used in the FIG. 1 embodiment. The optical fiber 20 has an end face 20f that corresponds to the reflective surface 3a of the pinhole mirror 3 in the FIG. 1 embodiment. The end face 20f has a light-transmitting portion (from which the measurement beam is emitted) that corresponds to the pinhole 3c in the FIG. 1 embodiment.

In this embodiment, use of an optical fiber 20 rather than a mirror advantageously simplifies the construction of the optical system of the measuring apparatus. Also, adjustments of the optical system as required for measuring different aspherical test surfaces can be made easily. For example, an adjustment of the distance between the aspherical test surface TS and the end face 20f of the optical fiber 20 is easily achieved by moving the end face 20f (double-headed arrow).

The end face 20f desirably has a reflective surface larger than $2(r)dW_{max}$.

In an alternative configuration, this embodiment can comprise multiple light sources 1 having different respective oscillation wavelengths. Each such light source is provided with a respective optical fiber 20 for transmitting the light from the respective source. All the optical fibers desirably terminate at the same end face. Such a configuration is useful for performing measurements at different wavelengths relatively easily. The wavelength(s) actually delivered to and released from the end face 20f can be selected using any of various wavelength selectors.

The range over which the profile of an aspherical surface can be measured at any one time is narrower in inverse proportion to the wavelength used. On the other hand, the measurement resolution is less in direct proportion to the wavelength. Hence, measurement accuracy over the entire aspherical test surface TS can be increased by performing measurements using multiple wavelengths and combining the respective results to yield an overall profile of the test surface. Such a configuration also permits simultaneous measurements based on a combination of two or more wavelengths (each wavelength being generated by a respective source) so as to increase the measurement range at any instant in time.

Performing measurements using multiple wavelengths is also useful whenever the test surface TS is coated (e.g., with a reflective or antireflective film). For example, if the test surface TS is a reflective mirror for use in extreme ultraviolet lithography (hereafter referred to as "EUVL"), a multi-layer reflective film for the EUVL exposure light is applied after forming the curved surface of the mirror. To confirm that the surface profile of the mirror is not distorted or otherwise altered by the application of the multi-layer film, it is desirable to perform measurements of the surface profile of the mirror before and after applying the multi-layer film. However, according to conventional practice, in measurements performed after applying the multi-layer film, it is impossible to distinguish profile changes from phase changes caused by reflection from the multi-layer film. By performing measurements using multiple wavelengths and using, e.g., the FIG. 2 embodiment, it is now possible to ascertain whether the mirror surface has undergone an actual physical deformation or is now exhibiting a phase change caused by application of the multi-layer film.

The sample 4, having the aspherical test surface TS, can be mounted on a rotatable stage S to allow the sample 4 to be rotated about its optical axis A during measurement. Multiple measurements are obtained at different respective angular orientations of the sample 4 about the optical axis A. The calculations of surface topography are performed based on the multiple measurement results thus obtained. Thus, it is possible to reveal rotationally symmetrical features and rotationally asymmetrical features of the test surface TS.

A half-mirror (not shown) can be disposed downstream of the image-focusing lens 6 to allow light to be conducted simultaneously to multiple detectors 7. Such a configuration is especially advantageous when each detector 7 has an image-pickup device (e.g., CCD) having a different respective spacing or density of pixels. The simultaneous use of detectors having different pixel arrays allows measurements to be performed at different respective resolution levels.

It is also possible to utilize multiple lenses 6 each having a different magnification and that are independently selectable (such as by being mounted on a turret or the like). Alternatively, the lens 6 can be configured as a "zoom" lens. Thus, measurements can be performed at different magnifications. By increasing the magnification, surface features generating interference fringes having a high spatial frequency can be measured.

In this embodiment, the measurement beam propagating from the end face 20f and from the test surface to the detector travels a longer distance than the reference beam propagating from the end face 20f to the detector 7. With such path-length differences, an external disturbance (such as convection of the medium through which the respective beams propagate) can be more pronounced on one beam relative to the other, leading to a decline in measurement accuracy. Convection is an important external disturbance that should be minimized. Convection is manifest as a fluctuation in the refractive index of one light path relative to the other light path. To reduce refractive-index fluctuations, the optical system downstream of the end face 20f of the optical fiber 20 is desirably situated in a helium or other inert-gas atmosphere 40. Helium gas exhibits a smaller change in refractive index with changes in temperature than does air. A similar beneficial effect can be realized by having the measurement light propagate in a vacuum rather than through a helium or other inert-gas atmosphere.

Another key external disturbance that should be minimized is vibration. Vibration can significantly alter the positional relationship between the aspherical test surface TS and the end face 20f of the optical fiber 20. Such positional changes cause corresponding changes in the phase of the interference fringes. To reduce such effects, the apparatus can be mounted on a vibration-isolating support. However, mounting on a vibration-isolation support alone is usually insufficient whenever an extremely high measurement accuracy is required, as when measuring optical components for EUVL optical systems. To meet such stringent requirements, an "adaptive" optical system can be employed in the interferometer. For example, the measurement wave front is focused on a four-part detector by a focusing lens. Any lateral deviation between the end face 20b of the optical fiber 20 and the aspherical test surface TS can be measured.

In addition, a change in the spacing between the end face 20f of the optical fiber 20 and the aspherical test surface TS can be measured by measuring changes in the focus of a measurement wave front. This can be achieved, e.g., by conventional methods such as the Foucault method, or the astigmatic aberration method. By routing such data as feedback to the motor 9 in real time, the desired fixed positional relationship between the end face 20f of the optical fiber 20 and the spherical test surface TS can be maintained constantly. If the spot diameter of measurement light, from the test surface TS, on the end face 20f is excessively large due to a large deviation of the aspherical test surface TS from a best-fit spherical surface, then only the central portion of the measurement wavefront can be used. A similar effect can be realized by routing data as feedback to the stage S on which the sample 4 is mounted, and manipulating the stage S in real time as required to maintain the desired fixed positional relationship between the test surface TS and the end face 20f.

Of course, any of the foregoing methods of at least reducing the effects of external disturbances can be applied with equal facility to any of the other representative embodiments disclosed herein.

Third Representative Embodiment

Figure 3:
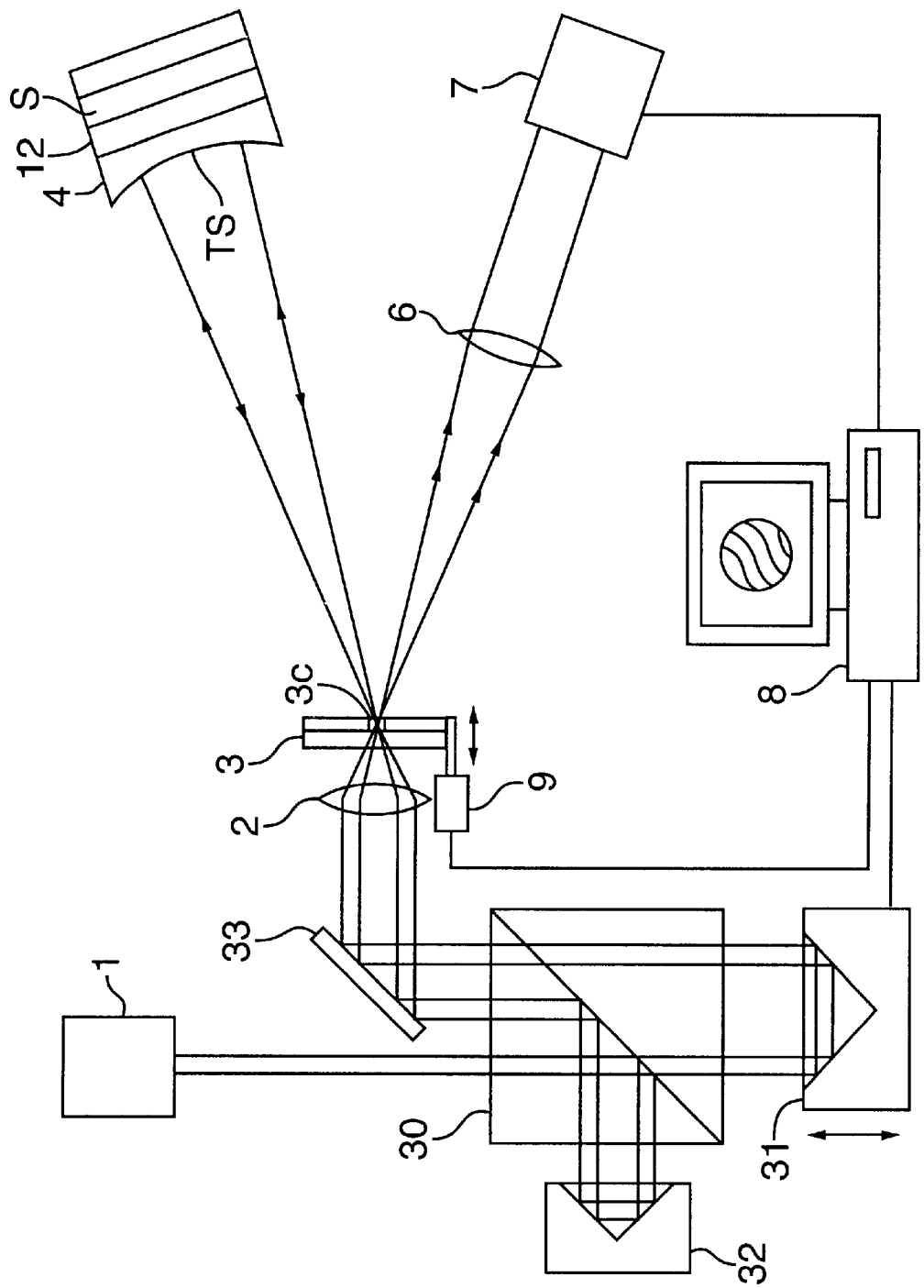
FIG. 3 is a schematic optical diagram of an apparatus according to a third representative embodiment of the invention.

The third representative embodiment is shown in FIG. 3, in which components that are the same as in the first representative embodiment have the same respective reference numerals and are not described further. Temporally incoherent laser light is produced by a source 1. The source 1 can be, e.g., an excimer laser. Alternatively, the source 1 can be any of various other lasers, or a combination of lasers having different respective wavelengths, or even a source of white light.

Light from the source 1 is split into a measurement beam and a reference beam by a beamsplitter 30. The measurement beam passes through the beamsplitter 30 and strikes a movable reflective mirror 31 that constitutes a light-path-adjustment means. The measurement beam passes again through the beamsplitter 30, and the trajectory of the measurement beam is bent by reflection from a bending mirror 33. The measurement light is focused by a lens 2 onto a pinhole aperture 3c defined by a pinhole mirror 3.

Meanwhile, the reference beam is reflected by the beamsplitter 30 and strikes a fixed reflective mirror 32. The reference beam re-enters the beamsplitter 30 and is reflected by the beamsplitter to the bending mirror 33. The bending mirror directs the reference beam to the lens 2 that focuses the reference beam onto the pinhole 3c.

The measurement beam passing through the pinhole 3c irradiates the aspherical test surface TS of the sample 4. Measurement light is reflected by the test surface TS and is again focused on the pinhole mirror 3. The measurement light reflects from the pinhole mirror 3 and passes through an image-focusing lens 6 to a light-receiving surface of a detector 7 (e.g., CCD).

The reference beam passing through the pinhole 3c propagates directly through the lens 6 to the light-receiving surface of the detector 7. Both light beams reaching the surface of the detector 7 form interference fringes, and the profile of the aspherical test surface TS is determined in a manner similar to that performed by the first representative embodiment.

In the FIG. 3 embodiment, interference fringes with optimal contrast can be obtained by appropriately moving the movable mirror 31 (double-headed arrow). Such adjustment of the movable mirror 31 is performed until the respective trajectory path lengths of the measurement beam and of the reference beam coincide with each other. ("Coincide" means having the same axial propagation path length.)

The interferometer of this embodiment is also useful for accurately determining the distance between the pinhole mirror 3 and the test surface TS. This is advantageous because, among various benefits, the radius of curvature of the test surface can be determined with high accuracy. First, before mounting the sample 4 on the stage S, a first measurement of the trajectory path length from the test surface TS to a point immediately adjacent the pinhole mirror 3 is performed. To obtain the measurement, the mirror 31 is moved as required to obtain interference fringes having maximal contrast. Next, the sample 4 possessing the aspherical test surface TS is mounted onto the stage S. A second measurement of the trajectory path length from the test surface TS to a point immediately adjacent the pinhole mirror 3 at which interference fringes having optimal contrast are produced is performed by appropriately moving the mirror 31. The set position of the test surface TS can be determined accurately by calculating the difference in trajectory path lengths obtained in the first and second measurements.

In instances in which light beams of two or more wavelengths are used, and a first interference-fringe condition and a second interference-fringe condition are analyzed, the distance between the pinhole mirror and the test surface can also be accurately measured. This is done by arranging the system so that the central portion of the test surface is measured.

Fourth Representative Embodiment

Figure 5:
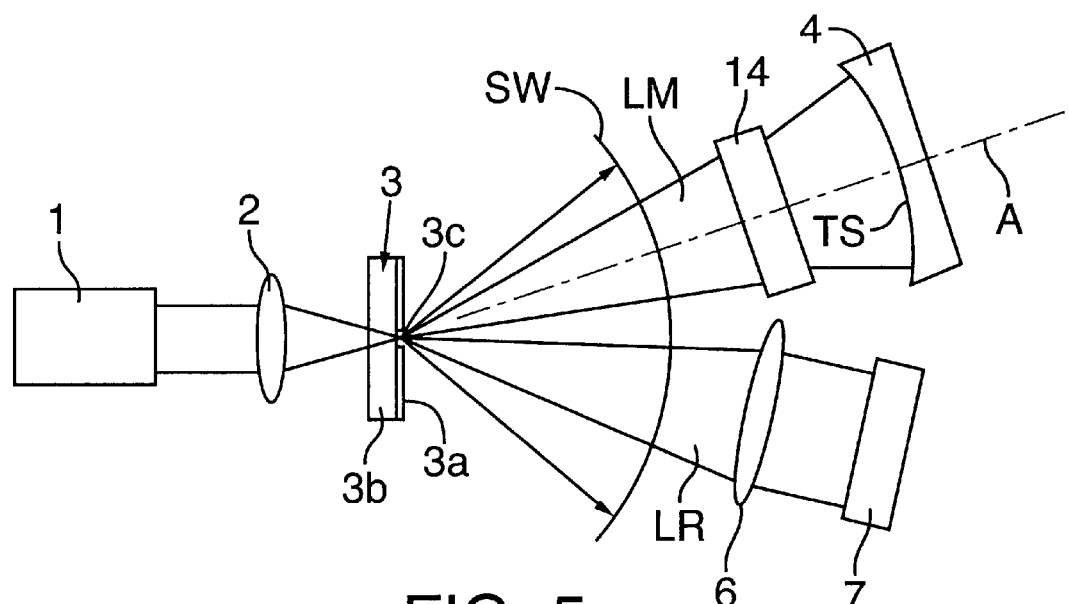
FIG. 5 is a schematic optical diagram of an apparatus according to a fourth representative embodiment of the invention.

This embodiment is depicted in FIG. 5, in which components that are similar to components shown in FIG. 1 have the same respective reference numerals and are not described further.

A pinhole mirror 3 is situated between a light source 1 (preferably a laser) and a sample 4 having an aspherical test surface TS that is to be measured. The pinhole mirror 3 includes a reflective surface 3a that defines a pinhole aperture 3c as described above in the first representative embodiment.

The light emitted by the source 1 is focused by a lens 2 and converged onto the pinhole 3c. This light is diffracted by the pinhole 3c and diverges downstream of the pinhole mirror 3 as an ideal spherical wave SW. A portion of the spherical wave SW is used as a measurement beam LM. The measurement beam LM is converted by a null element 14 into an aspherical wavefront that ideally would be perpendicularly incident, in the same phase, to all regions of an ideal aspherical surface corresponding to the actual test surface TS. The measurement beam LM is reflected by the test surface TS to converge on the pinhole mirror 3 via the null element 14.

Whenever the test surface TS has a corresponding ideal aspherical topographical (surface) profile, the wavefront of the measurement beam LM focused onto the pinhole mirror 3 is a spherical wave. The measurement beam LM is reflected by the pinhole mirror 3 to propagate toward an image-focusing lens 6 that collimates the measurement beam for impingement on a light-receiving surface of a detector 7 (e.g., CCD). The lens 6 also serves to focus an image of the test surface TS on the light-receiving surface of the detector 7. As discussed with respect to the first representative embodiment, the lens 6 is configured to exhibit minimal distortion.

Meanwhile, a portion of the ideal spherical wave SW diverging from the pinhole 3c passes as a reference beam LR through the lens 6 and is thus collimated for impingement onto the light-receiving surface of the detector 7.

Co-propagation of the measurement beam LM and the reference beam LR to the detector 7 generates interference fringes that are received and detected by the detector 7. The lateral coordinates of the interference fringes are measured. To such end, the detector 7 is connected to a computer (not shown, but see the first representative embodiment). As described with respect to the first representative embodiment, any deviations of the coordinates for the interference fringes generated by measurement light reflecting from the actual test surface TS from corresponding ideal design coordinates are measured. Thus, an accurate relationship is established between coordinates on the test surface TS and respective coordinates on the light-receiving surface of the detector 7.

Whenever the test surface TS has an ideal shape for the particular null element 14, the measurement-beam wavefront and the reference-beam wavefront coincide (i. e., are nullified). This allows the entire profile of the test surface TS to be measured at one time.

The computer (not shown) analyzes the interference-fringe data from the detector 7 and calculates from such data the profile of the test surface TS. Normally, in order to calculate the profile of the test surface TS from the interference fringes, the sample 4 is moved slightly on the optical axis A during measurement of the interference fringes. This technique of axially moving the sample 4 is conventionally known as the "phase-shift interference" technique. Movement of the sample 4 is desirably effected using a piezoelectric element or analogous appliance (not shown in the figures but see the first representative embodiment).

Examples of null elements 14 include, but are not limited to, elements comprising lenses including spherical and planar surfaces, elements including mirrors, elements including spherical and flat mirrors, elements including aspherical lenses, elements including aspherical mirrors, elements including transmission-type diffraction-optical elements, and elements including reflection-type diffraction optical elements.

Figure 6:
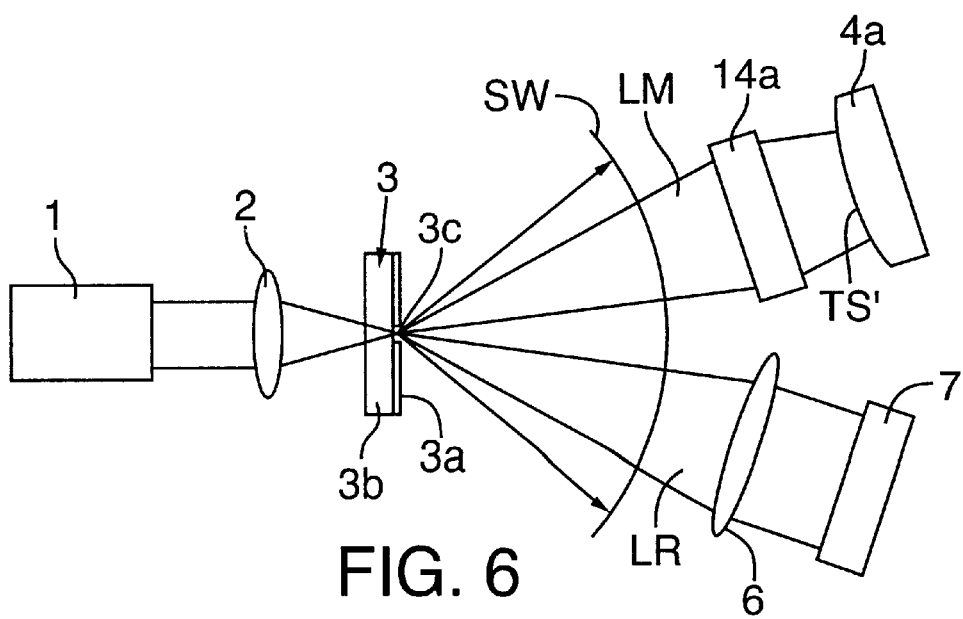
FIG. 6 illustrates an alternative configuration of the fourth representative embodiment.

In a variation of this embodiment shown in FIG. 6, a convex aspherical test surface TS' is measured by using a null element 14a that converts an ideal spherical wavefront SW, divergently propagating from the pinhole 3c, into an aspherical wavefront. The resulting wavefront is perpendicularly incident in the same phase on the convex test surface TS'.

Whereas a pinhole mirror 3 is used in this embodiment to produce a reference spherical wavefront, it is also possible to use an optical fiber or optical waveguide to produce such a wavefront, as generally discussed in the second representative embodiment.

Fifth Representative Embodiment

Figure 7:
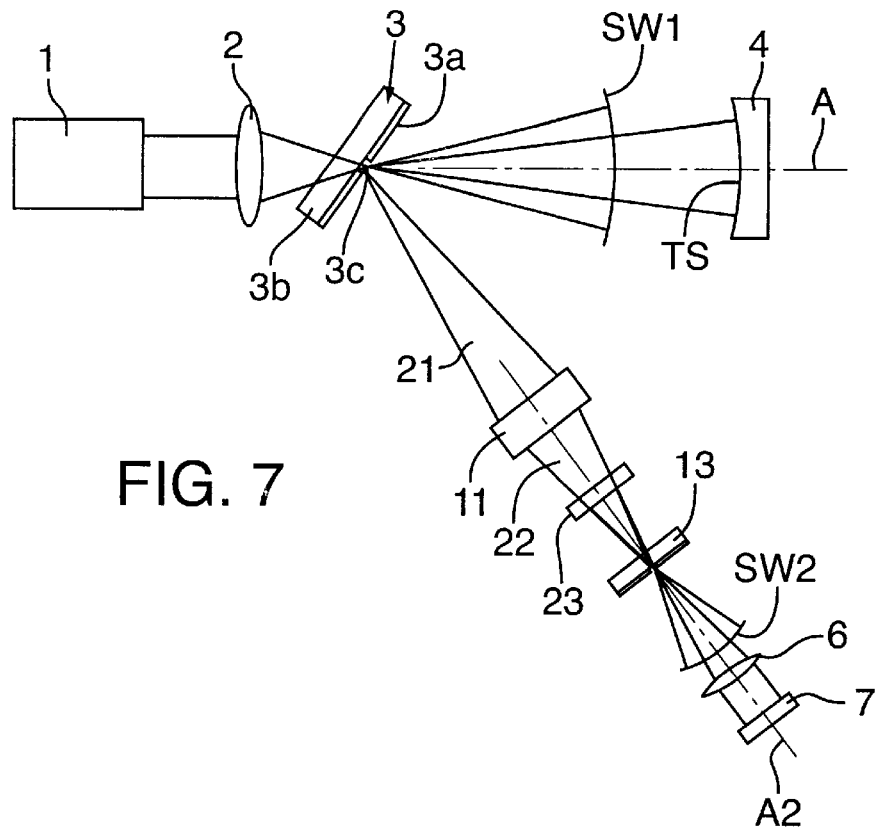
FIG. 7 is a schematic optical diagram of an apparatus according to a fifth representative embodiment of the invention.

This embodiment is depicted in FIG. 7 in which components that are the same as in FIG. 1 have the same respective reference numerals and are not described further.

Similar to the FIG. 1 embodiment, this fifth representative embodiment comprises a pinhole mirror 3. However, in contrast to the FIG. 1 embodiment, the pinhole mirror 3 is tilted relative to the propagation axis A of light reflected from a test surface TS of a sample 4, as discussed below.

The source 1 is desirably a laser. The lens 2 focuses light emitted from the source 1 onto the pinhole 3c in the mirror 3. The pinhole 3c diffracts light passing through it. The resulting diffracted light propagates divergently downstream of the pinhole 3c as an ideal spherical wavefront SW1. A portion of the light having the spherical wavefront SW1 impinges on and reflects from the test surface TS of a sample 4. The reflected light converges on the pinhole mirror 3 and is reflected toward a detector 7. The pinhole mirror 3 is oriented at an angle relative to the axis A such that light 21 reflected by the pinhole mirror 3 is not within the spherical wavefront SW1.

The light 21 reflected from the pinhole mirror 3 passes through a null element 11 configured to convert the aspherical wavefront of the light 21 (formed by reflection from the test surface TS) into a spherical wavefront 22. Any deviation of the spherical wavefront 22, propagating downstream of the null element 11, from an ideal spherical wavefront is attributable to a corresponding error in the surface topography of the aspherical test surface TS. The light beam 22 passes through a diffraction grating 23 that directs light of different diffraction orders in different directions relative to the diffraction grating 23. The diffraction grating 23 serves as a light-path-splitting means situated downstream of the null element 11 itself but upstream of the focal point of the null element 11.

Figure 8:
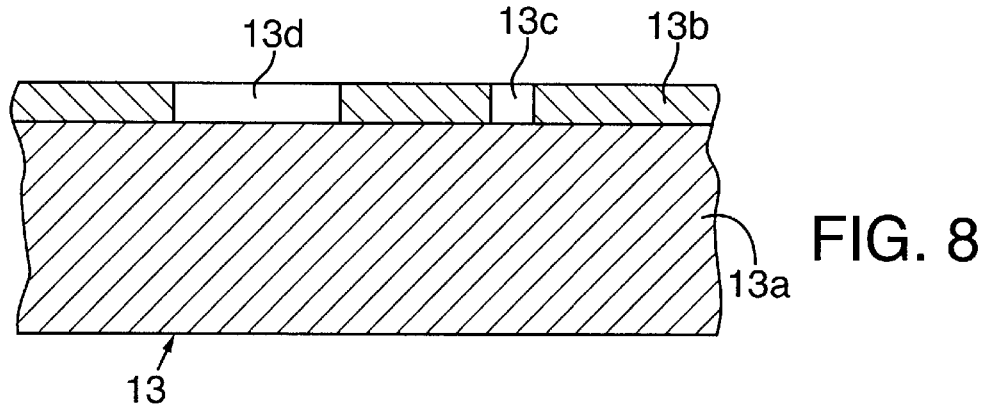
FIG. 8 is a vertical section of a pinhole element used to generate orders of diffracted light in the fifth representative embodiment.

A pinhole element 13 is situated downstream of the diffraction grating 23. The pinhole element 13, shown in FIG. 8, comprises a metal film 13b applied (e.g., by vacuum evaporation) to the surface of a transparent substrate 13a (e.g., glass). The metal film 13b defines a pinhole 13c and a window 13d. The pinhole element 13 is disposed at the focal point of the null element 11. The pinhole element 13 is configured and positioned such that zero-order diffracted light is focused on the pinhole 13c and first-order diffracted light passes through the window 13d. Light of all other diffraction orders is blocked by the metal film 13b.

The zero-order diffracted light passing through the pinhole 13c has an ideal spherical wavefront SW2. The wavefront SW2, as well as the first-order light passing through the window 13d, are collimated by passage through an image-focusing lens 6 to impinge on a light-receiving surface of a detector 7 (e.g., CCD).

The lens 6 also serves to focus an image of the aspherical test surface TS on the light-receiving surface of the detector 7. The lens 6 is configured such that distortion is minimized as much as possible so that the profile of the aspherical test surface TS can be accurately determined. As discussed in the first representative embodiment, the lateral coordinates of interference fringes as formed on the light-receiving surface of the detector 7 are determined. Also, actual values of distortion are compared to corresponding theoretical design values; thus, any adverse contribution by the lens 6 is subtracted. By such calculations, an accurate relationship is determined between lateral coordinates on the test surface TS and corresponding lateral coordinates on the light-receiving surface of the detector 7.

The zero-order and first-order light passing through the pinhole element 13 interfere with each other. The resulting interference fringes as incident on the light-receiving surface of the detector 7 are detected. Whenever the test surface TS has an ideal aspherical profile, wavefronts in the two beams coincide and are nullified. Under such conditions, the profile of the entire aspherical test surface TS can be measured at the same time.

The output from the detector 7 is input to a computer (not shown but understood to be connected to the detector as shown in FIG. 1). The computer analyzes data encoded in the detector output. Any topographical anomaly in the aspherical profile of the test surface TS is manifest as a corresponding aberration of the wavefront produced by the null element 11 which, in turn, is detected by a change in the interference fringes. The error in the profile of the aspherical test surface TS is determined from analysis of the interference fringe pattern.

To calculate the profile of the aspherical surface TS from the interference fringes, the diffraction grating 23 can be moved slightly in a direction perpendicular to the optical axis A2 and perpendicular to the lines of the diffraction grating 23. Desirably, such movement is controllably effected by a piezo-electric element (not shown) to which the diffraction grating 23 is mounted. Thus, the accuracy with which the test surface TS matches a corresponding desired theoretical profile can be measured with high accuracy by phase-shift interferometry.

Examples of null elements 11 are listed in the description of the fourth representative embodiment above.

Since the difference in light-path length between the two light beams that form the interference fringes is essentially zero, measurements can be performed even if the light source 1 has a short coherence length. Since the two light beams propagate essentially along the same light path, this embodiment is advantageous in that the system is relatively immune to effects of air fluctuations and mechanical vibration.

Although this embodiment is described in the context of zero-order light from the diffraction grating 23 being used as a reference spherical wavefront (with first-order light being used as a test wavefront for generating interference fringes), it will be understood that any of various other configurations are possible in which light of other diffraction-order numbers is used.

Figure 9:
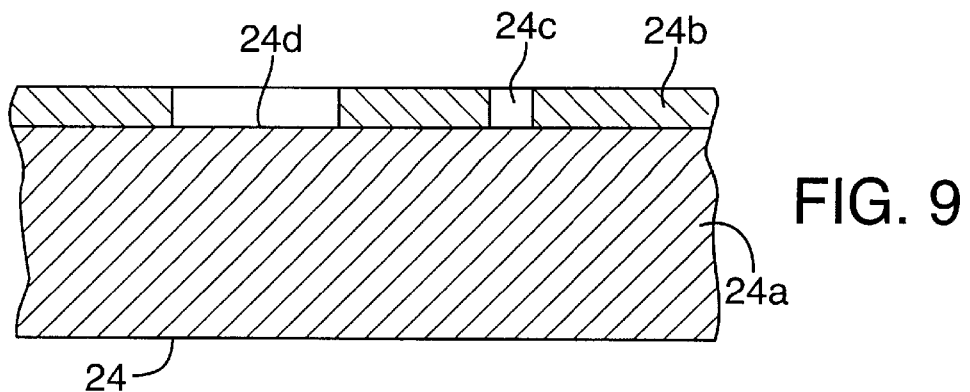
FIG. 9 is a vertical section of an alternative light-path-splitting member that can be used in the fifth representative embodiment.

Although this embodiment employs a diffraction grating 23 as a light-path splitting means, it is also possible to use a light-path-splitting member 24 of the type shown in FIG. 9. In FIG. 9, a beamsplitter opening 24d and a pinhole 24c are defined in an opaque layer 24b on a substrate 24a (e.g., glass). Further alternatively, it is possible to utilize some other light-path splitting means.

Figure 10:
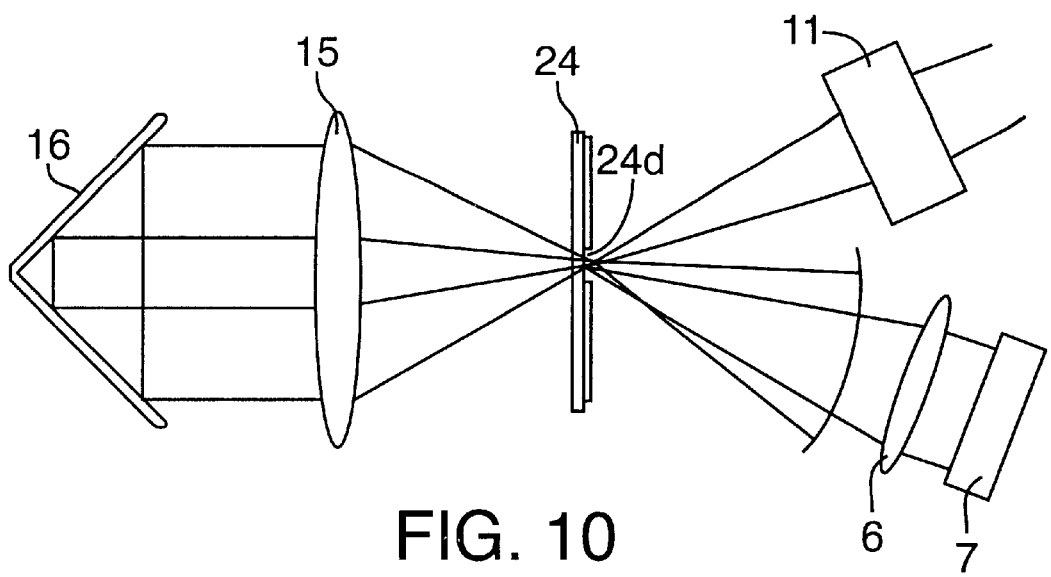
FIG. 10 illustrates a representative manner in which the light-path-splitting member of FIG. 9 can be used in the fifth representative embodiment.

An optical diagram showing a representative use of the light-path-splitting member 24 is shown in FIG. 10. A portion of the light beam (after being converted by the null element 11) is reflected by the beamsplitter opening 24d, is collimated by the lens 6, and propagates to the light-receiving surface of the detector 7. Meanwhile, light passing through the beamsplitter opening 24d is collimated by a lens 15. The resulting collimated light beam is bent back at a prescribed angle by a double mirror 16. The lens 15 converges the returned light onto the pinhole 24c. An ideal spherical wavefront generated from diffraction by the pinhole 24c is collimated by the lens 6 and propagates to the light-receiving surface of the detector 7. Any error in the profile of the aspherical test surface TS is determined from interference fringes generated by interference of the two light beams reaching the light-receiving surface of the detector 7.

When using a light-path-splitting member 24 in a manner as shown in FIG. 10, phase-shift interferometry can be performed by moving the double mirror 1 6 slightly on the optical axis of the lens 15. With such a configuration, measurements can be performed with higher accuracy than otherwise would be possible in a phase-shift interferometry method in which the test surface TS is moved by a slight amount.

This embodiment is configured such that the measurement beam 21 reflected from the pinhole mirror 3 is converted into a spherical wavefront by passage through the null element 11. As an alternative configuration, the null element is installed between the pinhole 3c and the test surface TS, wherein the measurement beam is perpendicularly incident, in the same phase, on the test surface TS.

Sixth Representative Embodiment

Figure 11:
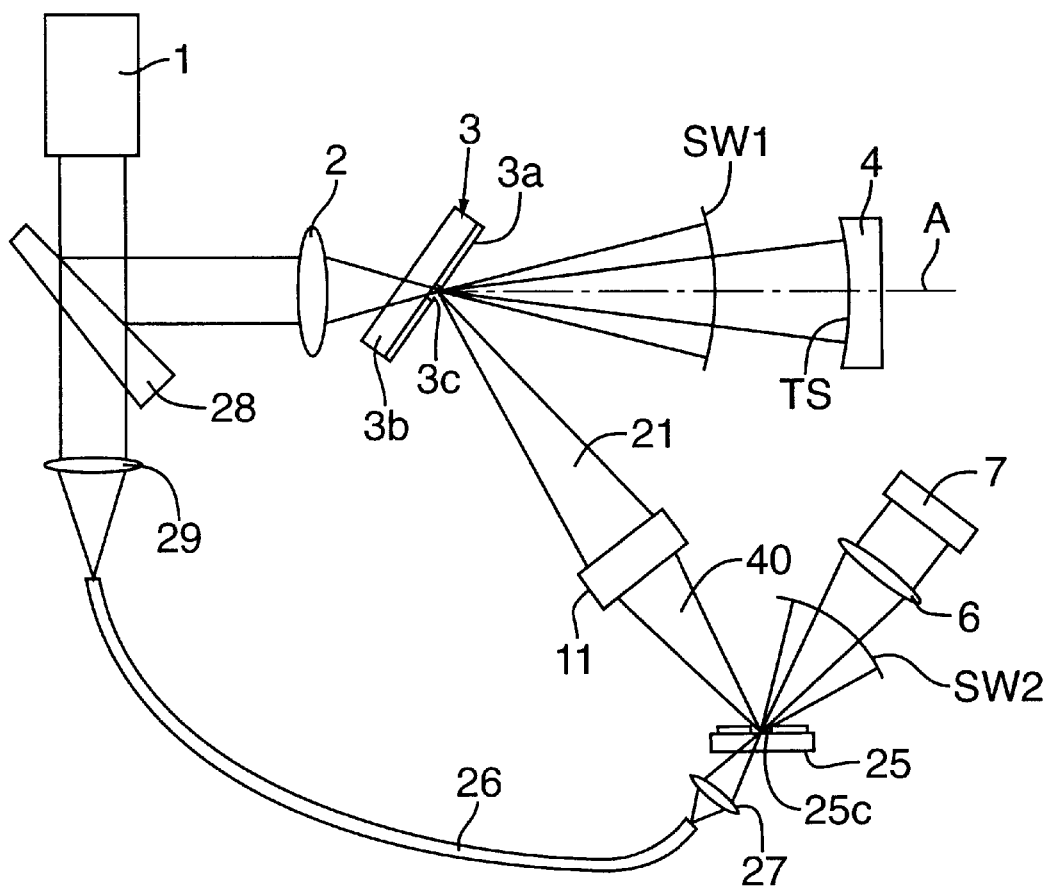
FIG. 11 is a schematic optical diagram of an apparatus according to a sixth representative embodiment of the invention.

The configuration of this embodiment is shown in FIG. 11, in which components that are the same as components in the FIG. 7 embodiment have the same respective reference numerals and are not described further. This embodiment comprises not only the pinhole mirror 3 discussed above but also a second pinhole mirror 25 configured similarly to the pinhole mirror 3.

Laser light emitted from a light source 1 is focused by a lens 2 onto the pinhole 3c defined by the pinhole mirror 3. As the light passes through the pinhole 3c, the pinhole 3c diffracts the light and forms a divergent ideal spherical wavefront SW1 propagating downstream of the pinhole 3c. A portion of the spherical-wavefront light is reflected by the aspherical test surface TS of a sample 4, which converges the reflected light onto the pinhole mirror 3. The light is reflected as a measurement beam 21. The angle of the pinhole mirror 3 relative to the propagation axis A of light reflected from the test surface TS is sufficient to ensure that the measurement beam 21 does not interact with the spherical wavefront SW1. The beam 21 propagates to a null element 11 configured such that the measurement beam 21 (having an aspherical wavefront generated by reflection of the wavefront SW1 from the aspherical test surface TS) is converted into a spherical-wavefront beam 40. Any deviation of the wavefront of the beam 40 from an ideal spherical profile corresponds to a corresponding profile anomaly of the test surface TS from its ideal aspherical profile.

The beam 40 from the null element 11 is incident on the second pinhole mirror 25 at about the location of a pinhole 25c defined by the mirror 25. Light of the beam 40 reflected by the second pinhole mirror 25 is collimated by passage through an image-focusing lens 6 and is then incident on a light-receiving surface of a detector 7 (e.g., CCD). The lens 6 also serves to focus an image of the test surface TS on the light-receiving surface of the detector 7. The lens 6 is desirably configured to exhibit minimal distortion so that the profile of the test surface TS can be accurately determined. As discussed with respect to the first representative embodiment, the lateral coordinates of interference fringes formed on the light-receiving surface of the detector 7 are corrected using theoretical design values and actual measured values of distortion. Thus, an accurate relationship can be established between coordinates on the test surface TS and lateral coordinates on the light-receiving surface of the detector 7.

Meanwhile, light from the source 1 passes through a beamsplitter 28 and a focusing lens 29, and is conducted to the second pinhole mirror 25 by an optical fiber 26. The light emitted from the terminus of the optical fiber 26 is focused on the pinhole 25c by a lens 27. As the light from the optical fiber 26 passes through the pinhole 25c, an ideal spherical wavefront SW2 is produced as a result of diffraction by the pinhole 25c. The spherical-wavefront light is collimated by passage through the lens 6, and propagates to the light-receiving surface of the detector 7.

Light of the spherical wavefront SW2 interferes with the beam 40 reflected from the pinhole mirror 25. The detector 7 receives the resulting interference fringes. If the test surface TS has an ideal aspherical profile, then the two wavefronts exactly coincide (i.e., are nullified). Such coincidence allows the entire profile of the test surface TS to be measured at one time. The output from the detector 7 is input into a computer (not shown, but see FIG. 1) programmed to analyze the interference-fringe data from the detector 7 and determine from such data the profile of the test surface TS.

In order to calculate the profile of the test surface TS from the interference fringes, the test surface TS is desirably moved slightly along the optical axis A. Such movement is desirably effected in a controlled manner by a piezoelectric element (not shown, but see item 12 in FIG. 1). Such movement allows the profile of the test surface TS to be measured with high accuracy by phase-shift interferometry.

The null element 11 can be any of various suitable elements as discussed above with respect to the fourth representative embodiment.

Figure 12:
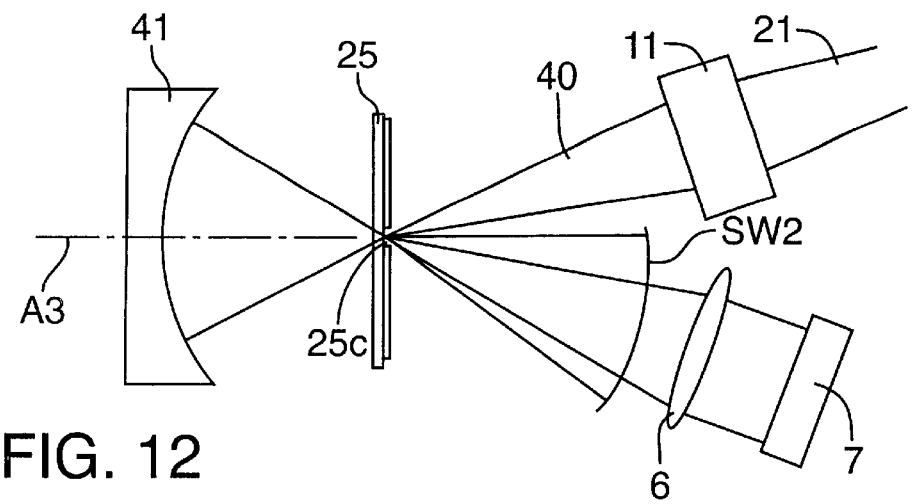
FIG. 12 illustrates a first alternative configuration for generating a reference spherical wavefront in the sixth representative embodiment.
Figure 13:
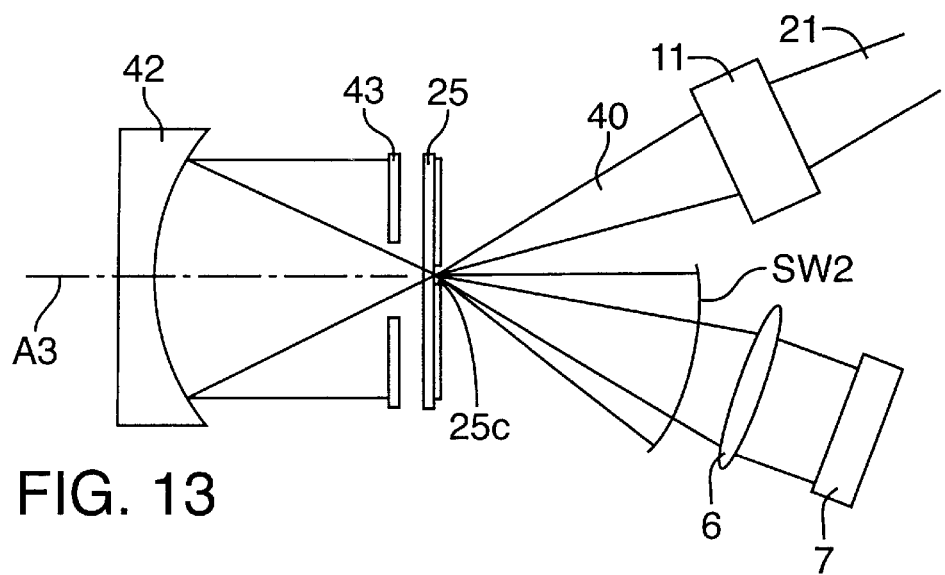
FIG. 13 illustrates a second alternative configuration for generating a reference spherical wavefront in the sixth representative embodiment.
Figure 14:
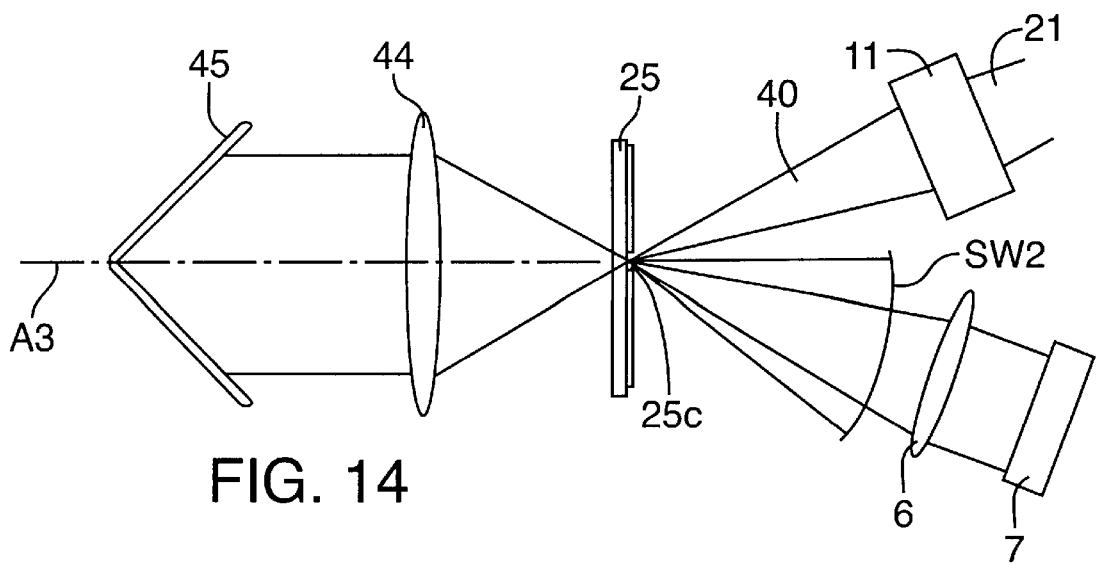
FIG. 14 illustrates a third alternative configuration for generating a reference spherical wavefront in the sixth representative embodiment.

In this embodiment, a reference spherical wave is obtained by irradiating the pinhole 25c with light from the optical fiber 26. Alternatively, it is possible to re-focus light, passing through the pinhole 25c, on the pinhole 25c using a spherical mirror 41 to form the reference spherical wavefront SW2, as shown in FIG. 12. It is also possible to replace the spherical mirror 41 shown in FIG. 12 with a parabolic mirror 42 and a flat mirror 43 as shown in FIG. 13. Further alternatively, it is possible to replace the spherical mirror 41 of FIG. 12 with a lens 44 and a corner-cube reflector 45, as shown in FIG. 14.

In the configuration shown in FIG. 13, phase-shift interferometry can be performed by moving the flat mirror 43 slightly along an axis A3. In the configuration shown in FIG. 14, phase-shift interferometry can be performed by moving the corner-cube reflector 45 slightly along the axis A3. Such phase-shift interferometry provides measurements at higher accuracy than is otherwise achievable by moving the test surface TS slightly along the axis A.

This embodiment is configured such that the spherical-wavefront "measurement beam" 40 is produced by the null element 11 situated downstream of the first pinhole mirror 3. In an alternative configuration, the null element can be installed between the pinhole 3c and the test surface TS, wherein the measurement light beam is perpendicularly incident, in the same phase, on the test surface TS.

Seventh Representative Embodiment

This embodiment is shown in FIG. 15, wherein components that are the same as shown in any of the representative embodiments discussed above have the same respective reference numbers and are not described further. This embodiment utilizes a pinhole mirror 3 similar to the pinhole mirror used and described above with respect to the first representative embodiment.

Laser light emitted from a light source 1 is focused by a lens 2 onto a pinhole 3c defined by the pinhole mirror 3. Light passing through the pinhole 3c is diffracted, as described above, to form an ideal spherical wavefront SW propagating downstream of the pinhole 3c. A portion of the spherical-wavefront beam SW is reflected by the aspherical test surface TS of a sample 4 as a measurement beam LM that converges onto the pinhole mirror 3. The measurement beam LM is reflected by the pinhole mirror 3 and collimated by a lens 50. The measurement beam LM exhibits a wavefront aberration corresponding to the profile of the aspherical test surface TS. The collimated measurement beam LM is incident on a diffraction optical element 51. The resulting first-order diffracted light passing through the diffraction element 51 propagates through a lens 52, through a pinhole 53c defined by a second pinhole mirror 53, and through a lens 6 to the light-receiving surface of a detector 7 (e.g., CCD).

Meanwhile, a portion of the spherical-wavefront beam SW is collimated by the lens 50 to form a reference beam LR. The reference beam LR is incident on the diffraction optical element 51. Zero-order light produced as the reference beam passes through the diffraction optical element 51 propagates through the lens 52, the pinhole 53c, and the lens 6 to the light-receiving surface of the detector 7.

The diffraction optical element 51 desirably comprises a diffraction pattern formed on the incident-light side of the diffraction element 51, and is configured so that the first-order diffracted light of the measurement beam LM (from an ideal aspherical test surface) is a planar wavefront. Hence, whenever the aspherical test surface TS has the ideal aspherical profile, the wavefronts of first-order diffracted light of the measurement beam LM and of zero-order diffracted light of the reference beam LR coincide with each other. i.e., these wavefronts are nullified, allowing the entire test surface TS to be measured at one time. After passing through the lens 52, the first-order light of the measurement beam LM and the zero-order light of the reference beam LR are converted into respective spherical wavefronts. These wavefronts pass through the pinhole 53c. The pinhole mirror 53 blocks diffracted light of other orders.

The lens 6 also serves to focus an image of the test surface TS on the light-receiving surface of the detector 7. As discussed in the preceding embodiments, the lens 6 exhibits minimal distortion so that the profile of the test surface TS can be accurately determined. By correcting the lateral coordinates of the interference fringes corresponding to actual distortion of the test surface with ideal design values, an accurate relationship between the coordinates on the test surface TS with corresponding coordinates on the detector 7 can be obtained.

Whereas this embodiment utilizes a pinhole mirror 3 to produce a reference spherical wavefront, it is alternatively possible to use an optical fiber or optical waveguide for such a purpose.

By using a null element 51, as discussed above, the profile of the entire test surface TS can be measured at one time. To such end, the null element 51 effectively makes the distribution of interference fringes over the light-receiving surface of the detector sparser and correspondingly more easily resolved by the detector 7.

Because a spherical wavefront produced by diffraction of light through a pinhole is used as a reference beam in any of these representative embodiments, there is no need for a reference surface, in contrast with a conventional Fizeau interferometer or Twyman-Green interferometer. Hence, any of the various embodiments disclosed herein achieve measurements of aspherical test surfaces with enhanced accuracy and precision, without being influenced by the accuracy and precision of a reference surface.

Whereas the invention has been described in connection with multiple representative embodiments, it will be understood that the invention is not limited to those embodiments. On the contrary, the invention is intended to encompass all modifications, alternatives, and equivalents as may be included within the spirit and scope of the invention as defined by the appended claims.

What is claimed is:

1. An apparatus for measuring a profile of an aspherical test surface of a sample, comprising:
   (a) a point light source configured and situated relative to the sample so as to produce, from an input light, a measurement beam of light propagating as a prescribed spherical wavefront from a point on the point light source to the test surface so as to reflect from the test surface;
   (b) a beamsplitter situated so as to receive light of the measurement beam reflected from the test surface, the beamsplitter being configured to split the reflected measurement beam into first and second measurement-beam portions each propagating along a respective path;
   (c) a light-diffraction element situated in the path of the first measurement-beam portion, the light-diffraction element being configured to diffract the light of the first measurement-beam portion into multiple orders of diffracted light and situated so as to cause the diffracted light to interfere with light of the second measurement-beam portion and produce interference fringes;
   (d) a detector configured and situated so as to detect the interference fringes; and
   (e) an optical element situated between the test surface and the beamsplitter and configured so as to convert the aspherical wavefront of the measurement beam reflected from the test surface into a desired spherical wavefront.

2. An apparatus for measuring a profile of an aspherical test surface of a sample, comprising:
   (a) a point light source configured and situated relative to the sample so as to produce, from an input light, a measurement beam of light propagating as a prescribed spherical wavefront from a point on the point light source to the test surface so as to reflect from the test surface;
   (b) a beamsplitter situated so as to receive light of the measurement beam reflected from the test surface, the beamsplitter being configured to split the reflected measurement beam into first and second measurement-beam portions each propagating along a respective path;
   (c) a light-diffraction element situated in the path of the first measurement-beam portion, the light-diffraction element being configured to diffract the light of the first measurement-beam portion into multiple orders of diffracted light and situated so as to cause the diffracted light to interfere with light of the second measurement-beam portion and produce interference fringes;

(d) a detector configured and situated so as to detect the interference fringes; and (e) an optical element situated between the point light source and the test surface and configured so as to convert the spherical wavefront of the measurement beam from the point light source into a desired aspherical wavefront.

3. In an apparatus for measuring a profile of an aspherical test surface of a sample, wherein the apparatus includes a point light source that produces, from an input light, a reference beam and a measurement beam emitted from a point on the light source, the reference beam having a prescribed wavefront and the measurement beam being directed to impinge on the test surface such that light of the measurement beam reflected from the test surface interferes with the reference beam to produce interference fringes; a detector situated so as to receive the interference fringes; and a processor connected to the detector and configured to analyze the interference fringes and calculate, from such analyses, a state of the interference fringes; an improvement in which the apparatus further comprises:

(a) a reflective surface situated in a light path between a source of the input light and the test surface, the reflective surface being configured to define the point light source;

(b) an optical element situated in a light path different from the light path extending from the test surface to the reflective surface, the optical element being configured to convert the wavefront propagating from the test surface from having an aspherical wavefront to having a spherical wavefront; and (c) the measurement beam being emitted from the point light source, reflected by the test surface, reflected by the reflective surface, and caused to pass through the optical element.

4. In an apparatus for measuring a profile of an aspherical test surface of a sample, wherein the apparatus includes a light source that produces a reference beam and a measurement beam, the reference beam having a prescribed wavefront and the measurement beam being directed to impinge on the test surface, the light of the measurement beam reflected from the test surface interfering with the reference beam to produce interference fringes; a detector situated so as to receive the interference fringes; and a processor connected to the detector and configured to analyze the interference fringes and calculate, from such analyses, a state of the interference fringes; an improvement in which the apparatus further comprises:

(a) a reflective surface situated in a light path between the light source and the test surface;

(b) an optical element situated in a light path extending from the test surface to the reflective surface, the optical element being configured to convert the wavefront propagating from the test surface from having a spherical wavefront to having an aspherical wavefront;

(c) a light-diffraction element situated in a light path different from the light path extending from the test surface to the reflective surface, the light-diffraction element defining a point light source and being configured to generate, from light entering the point light source, a diffracted light propagating from the point light source; and (d) the measurement beam being emitted from the point light source, passing a first time through the optical element, reflecting from the test surface, passing a second time through the optical element, and reflecting from the reflective surface to the detector.

* * * * *

UNITED STATES PATENT AND TRADEMARK OFFICE
CERTIFICATE OF CORRECTION

PATENT NO. : 6,344,898 B1
DATED : February 5, 2002
INVENTOR(S) : Gemma et al.

It is certified that error appears in the above-identified patent and that said Letters Patent is hereby corrected as shown below:

Column 17,
Line 25, "1 6" should be -- 16 --.

Column 19,
Line 47, "other. i.e." should be -- other. I.e. --.

Signed and Sealed this

Eleventh Day of November, 2003

JAMES E. ROGAN
*Director of the United States Patent and Trademark Office*